(12) United States Patent
McArdle

(10) Patent No.: US 7,958,145 B2
(45) Date of Patent: Jun. 7, 2011

(54) CREATING MULTIPLE MBEANS FROM A FACTORY MBEAN

(75) Inventor: James M. McArdle, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 621 days.

(21) Appl. No.: 11/943,220

(22) Filed: Nov. 20, 2007

(65) Prior Publication Data

US 2009/0132577 A1 May 21, 2009

(51) Int. Cl.
*G06F 7/00* (2006.01)
*G06F 15/00* (2006.01)

(52) U.S. Cl. ........ 707/781; 707/791; 707/802; 709/203; 709/224

(58) Field of Classification Search .......... 707/781, 707/791, 802; 709/203, 224
See application file for complete search history.

(56) References Cited

U.S. PATENT DOCUMENTS

| | | | |
|---|---|---|---|
| 6,938,260 B1 | 8/2005 | Watson | |
| 6,950,825 B2 | 9/2005 | Chang et al. | |
| 7,080,126 B2 | 7/2006 | Srivastava et al. | |
| 2004/0194066 A1 | 9/2004 | Frey et al. | |
| 2006/0184662 A1* | 8/2006 | Rivierre et al. | 709/224 |
| 2007/0233829 A1 | 10/2007 | Shah et al. | |
| 2008/0077922 A1* | 3/2008 | Doring | 718/100 |

OTHER PUBLICATIONS

Anonymous; "Singleton Pattern"; Wikipedia [Online], <http://en.wikipedia.org/w/index.php?title=Singleton_pattern &oldid=172142303>; retrieved Feb. 24, 2009; pp. 1 & 2.
"Java Management Extensions Instrumentation and Agent Specification"; Sun Microsystems Specification, XX, XX, vol. V1.02, Oct. 1, 2002, pp. 1-193; p. 17, p. 21 paragraph 1—p. 22 paragraph 6; p. 24 paragraph 7—paragraph 11.

* cited by examiner

*Primary Examiner* — Tim T. Vo
*Assistant Examiner* — Sangwoo Ahn
(74) *Attorney, Agent, or Firm* — Justin M. Dillon; Gregory K. Goshorn; Greg Goshorn, P.C.

(57) ABSTRACT

Provided is a method for creating a unique class of Mbean in which a "parent" Mbean generates and manages multiple "child" Mbeans. When a user requests the functionality of a particular Mbean, a specific type of Mbean, or parent Mbean, is called. The parent Mbean is a factory method that, rather than executing the request, generates a child Mbean to execute the request. The child Mbean is assigned a name that distinguishes the child from other children of the same parent and the process that called the parent is provided with the name. In this manner, the calling process may use the assigned name to access the specific child Mbean for future requests and the child Mbean is employed to store client state information.

20 Claims, 8 Drawing Sheets

CREATING MULTIPLE MBEANS FROM A FACTORY MBEAN

BACKGROUND

1. Technical Field

The claimed subject matter relates generally to techniques relating to managed computer programming objects and, more specifically, to a Managed JavaBean (Mbean) programming object that is able to generate and manage additional Mbeans.

2. Description of the Related Art

For the past several decades, computers have become increasingly connected. Originally, computers were stand-alone devices, each typically designed and programmed for a specific task. Soon however, the advantages of combining computers into networks became apparent. Networks of computers were able to share resources such as printers and memory and eventually even able to share, or distribute, processing tasks. For example, a search of a large database can often be broken into multiple, mutually exclusive tasks by assigning different processors and/or computers to search different segments of the database.

As computers have become increasingly interconnected, techniques have been developed to enable multiple computers to work together. One such development is JAVA®, a high-level programming language originally developed by Sun Microsystems, Inc. of Mountain View, Calif. JAVA® enables programmers to develop code that is platform independent. Simply stated, code written in the JAVA® programming language is converted, or "interpreted," into actual computer instructions corresponding to a particular computer by a JAVA® Virtual Machine (JVM) that executes on the computer. In other words, by installing a JVM that corresponds to particular computer hardware and the associated operating system, a programmer can write code without regard to the particular hardware and operating system.

In addition to the increased connectivity of traditional computers, many devices that incorporate computing components have also become both inter-connected and JAVA®-enabled. Examples include Internet, or "web," telephones, cable boxes and televisions and application clients and servers. To facilitate the management of such JAVA®-enable resources, JAVA® Management Extensions (JMX) has been developed. JMX is a standard for managing and monitoring devices, applications and services in a JAVA environment. JMX defines a management architecture, design patterns, application programming interfaces (APIs), and services for building web-based, distributed, dynamic and modular solutions to manage JAVA® resources and programming objects.

JMX provides for the creation and implementation of JAVA® managed beans, or "Mbeans," which are programming objects that represent objects to be managed. Each Mbean has a management interface that enables a user or program to monitor, manage and be notified of changes to particular configuration parameters of a corresponding resource. For example, an Mbean representing an application may include attributes and methods corresponding to the application's cache size. In this example, reading a "cacheSize" attribute would return the application's cache size and writing a "cacheSize" attribute would update the size of the application's cache, thus changing the application's configuration.

Although the JMX specification has been updated to include invocation in a multi-user, distributed environment, a JMX Mbean is typically a stand-alone object, i.e. Mbeans are not organized into hierarchies related to function. In other words, the current state of the art allows the end user to access a predefined Mbean but does not enable a user to generate a class of Mbeans in which individual Mbeans are managed by a "parent" Mbean and accessed based upon an assigned name. In addition, Mbeans are "singleton" objects. Only a single Mbean of any particular type is instantiated and that single Mbean does not store any client state information. Each time the Mbean of a particular type is called client state information must be passed to the Mbean.

SUMMARY OF THE CLAIMED SUBJECT MATTER

Provided is a method for creating a unique class of Mbean in which a "parent" Mbean generates and manages multiple "child" Mbeans. When a user requests the functionality of a particular Mbean, a specific type of Mbean, or parent Mbean, is called. The parent Mbean is a factory method that, rather than executing the request, generates a child Mbean to execute the request. The child Mbean is assigned a name that distinguishes the child from other children of the same parent and the process that called the parent is provided with the name. In this manner, the calling process may use the assigned name to access the specific child Mbean for future requests.

The disclosed technology extends the functionality of an Mbean by enabling one or more processes to tailor specific child Mbeans for unique functions. For example, a first child Mbean may provide access to a one particular database while a second child Mbean provides access to a different database. Both the first and second Mbean are managed by a single parent Mbean. The ability to call two different Mbeans, specified by assigned names and connected to different databases, but otherwise similar, simplifies Mbean management. Those with skill in the computing arts should appreciate that the disclosed technology may provide functionality in addition to database connectivity. For example, the functionality provided may be connectivity to a communication channel or a particular processing task.

In addition, the disclosed technology provides a means of maintaining state information in client Mbeans. The parent Mbean creates a child Mbean to store client state information, including for example database connection information. When a particular method is called in the parent Mbean, in conjunction with a key or child name, the method call is redirected to the appropriate child Mbean, which stores the client state information.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Figure 1:
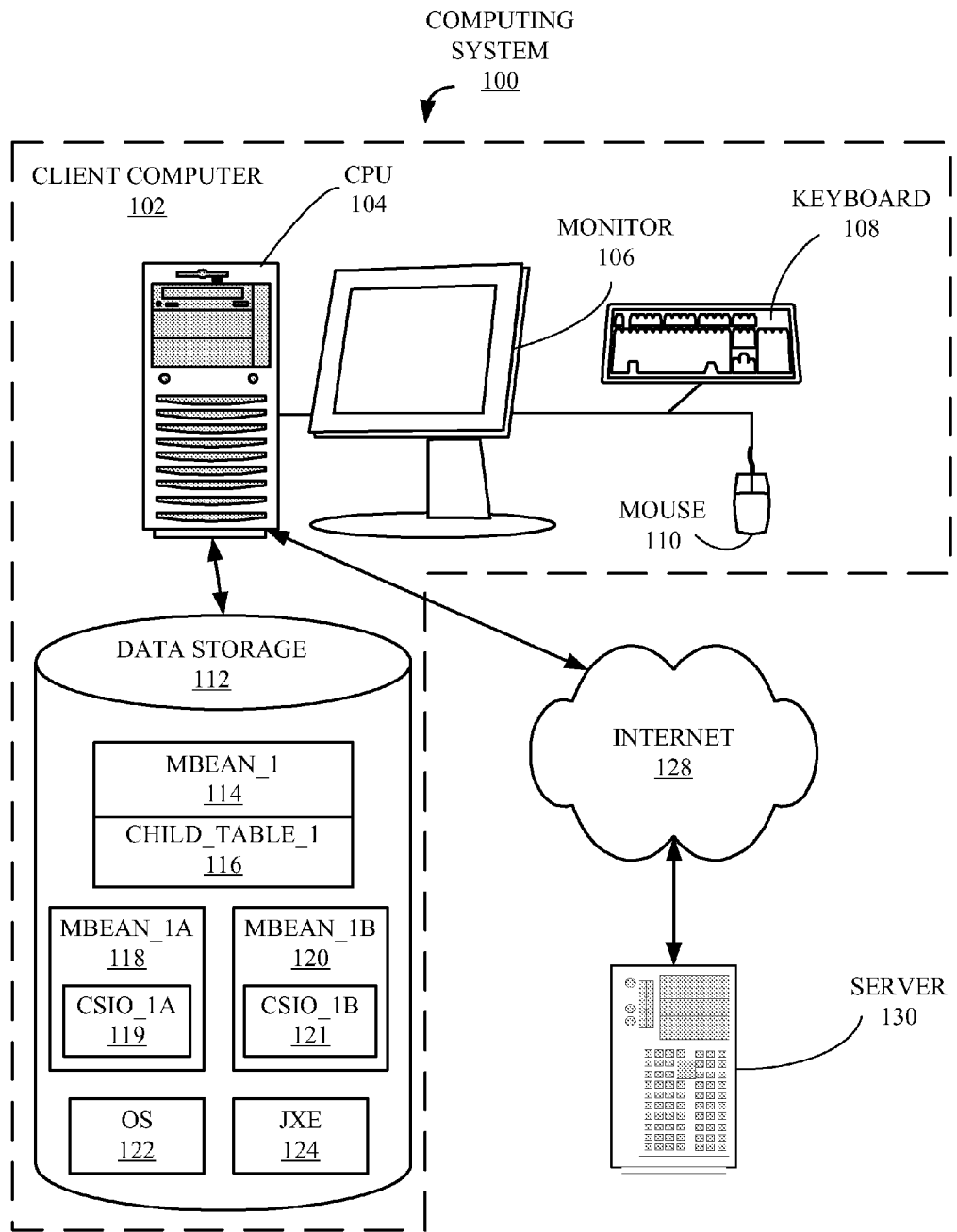
FIG. 1 is a block diagram of one example of a computing system that employs the claimed subject matter.

Although described with particular reference to the JAVA® Management Extensions (JMX) standard and, the claimed subject matter can be implemented in any information technology (IT) system in which access to programming objects by multiple users of applications is desirable. Those with skill in the computing arts will recognize that the disclosed embodiments have relevance to a wide variety of computing environments in addition to those described below. Further, although described with respect to JAVA® management beans (MBeans) and the JAVA environment, the claimed subject matter also is applicable to other types of managed modules, applications or any other type of interdependent computer logic in which one programming object is created to generate and manage other programming objects. In other words, the disclosed technology is applicable to any situation in which there is interdependent computer code and a user or developer needs or wants to ensure that the computing environment is highly reliable.

In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory an recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for simplifying and extending the usability of a JAVA MBean. The term "programmed method", as used herein, is defined to mean one or more process steps that are presently performed; or, alternatively, one or more process steps that are enabled to be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Turning now to the figures, FIG. 1 is a block diagram of one example of a computing system architecture 100 that incorporates the claimed subject matter. Computing system 100 includes a client computer 102, which includes a central processing unit (CPU) 104, coupled to a monitor 106, a keyboard 108 and a mouse 110. Monitor 106, keyboard 108 and mouse 110 facilitate human interaction with computing system 100 and client computer 102. Attached to CPU 104 is a data storage component 112, which may either be incorporated into CPU 104, i.e. an internal device, or attached externally to CPU 104 by means of various, commonly available connection devices such as but not limited to, a universal serial bus (USB) port (not shown).

Data storage 112 is illustrated storing several exemplary Java Management bundles, or "Mbeans," including a first Mbean, or "Mbean_1," 114, a second Mbean, or "Mbean_1A," 118 and a third Mbean, or "Mbean_1B," 120. It should be noted that a typical application or system may include many Mbeans, but for the sake of simplicity only three are shown. Also stored on data storage 112 are an operating system (OS) 122 and a JAVA execution engine (JXE) 124. Stored in conjunction with Mbean_1 114 is a child table, or "Child_Table_1," 116. Although illustrated as a part of Mbean_1 114, Child_table_1 116 may be a stand-alone entity that facilitates the creation and management of child Mbeans, associated with, in addition to children Mbeans of Mbean_1 114, other parent Mbeans (not shown). Stored in conjunction with Mbean_1A 118 and Mbean_1B 120 are client state information objects (CSIOs) 119 and 121, respectively.

In the following description, Mbean_1 114, Child_table_1 116, Mbean_1A 118, CSIO_1A 119, Mbean_B 120 and CSIO_1B 121 are objects created and managed in accordance with the claimed subject matter. Mbean_1 114 is a parent Mbean and Mbean_1A 118 and Mbean_1B 120 are child Mbeans of Mbean_1 114. Child_table_1 116 is employed by Mbean_1 114 for the creation and management of Mbean_1A 118 and Mbean_1B 120. Mbean_1A 118 and Mbean_1B 120 are the same type of object but are different instantiations, thus enabling Mbean_1A 118 and Mbean_1B 120 to each store their own client state information in CSIO_1A 119 and CSIO_1B 121, respectively. In the following example, client state information includes data relating to their respective names and connections. The claimed subject matter is capable of storing many other types of client state information; connection information is only used as one example. Mbean_1 114, Child_table_1 116, Mbean_1A 118, CSIO_1A 119, Mbean_1B 120, CSIO_1B 121, OS 122 and JXE 124 are described in more detail below in conjunction with FIGS. 2-8.

Client computer 102 is connected to the Internet 128, which is also connected to a server computer 130. Although in this example, client computer 102 and server 130 are communicatively coupled via the Internet 128, they could also be coupled through any number of communication mediums such as, but not limited to, a local area network (LAN) (not shown) and a direct wired connection.

Figure 2:
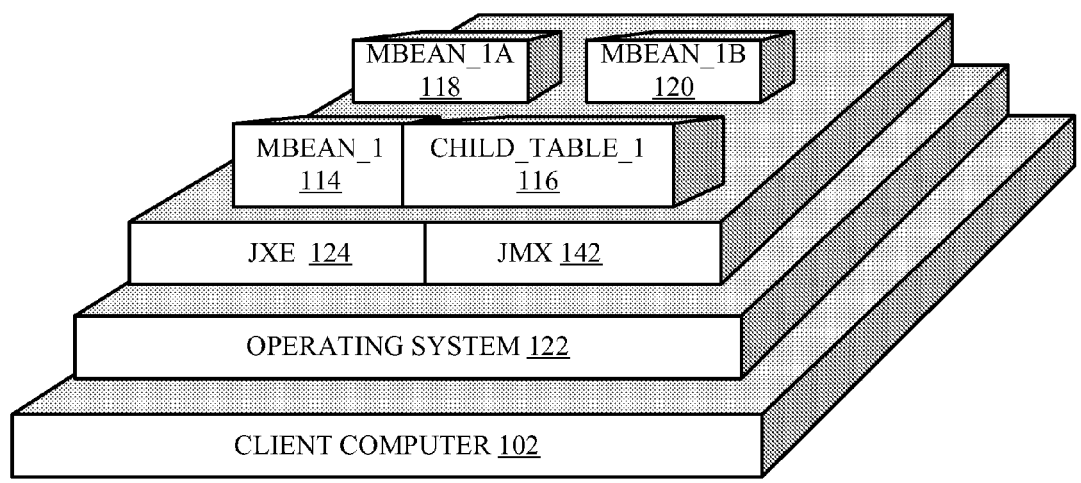
FIG. 2 is a block diagram of one example of a computer architecture that executes on the computing system of FIG. 1 and supports the techniques of the claimed subject matter.

FIG. 2 is a block diagram of computing system architecture 140 that executes on the computing platform, or hardware, represented by client computer 102 (FIG. 1). Other possible platforms include, but are not limited to, such computing platforms as server 130 (FIG. 1), television set top boxes, service gateways, cable modems, consumer electronic devices, personal computers (PCs), industrial computers and automobiles. OS 122 (FIG. 1) manages the resources of client computer 102. Examples of three OSs that support the claimed subject matter include Linux, MacIntosh and the various versions of Windows, all of which, as well as others, should be familiar to those with skill in the computing arts.

As mentioned above, in this example, OS 122 supports JXE 124 (FIG. 1) and JXE 124 implements the JAVA® programming language, which is a product of Sun Microsystems, Inc. of Santa Clara, Calif. JXE 124 includes a JAVA® runtime engine (JRE) (not shown) which executes JAVA® programs, JAVA® programs are compiled into byte codes which are interpreted by the JRE of JXE 124 rather then being compiled into native machine code. In this manner, a particular JAVA® program can be written to execute on any hardware platform 102 and OS 122 that includes a corresponding JXE like JXE 124.

JXE 124 provides an execution environment for, among other things, Mbeans, which in this example include Mbean_1 114 (FIG. 1), Mbean_1A 118 (FIG. 1) and Mbean_1B 120, which are managed by a JAVA® Management Extension (JMX) 142. In the following description, Mbeans 114, 118 and 120 are used as examples of Mbeans that are managed by JMX 142 according to the claimed subject matter. Although Mbeans 114, 118 and 120 are illustrated as residing on hardware platform 102, each could be located on different platforms, e.g. stored in memory (not shown) associated with server 130 (FIG. 1) and executed on server 130.

Figure 3:
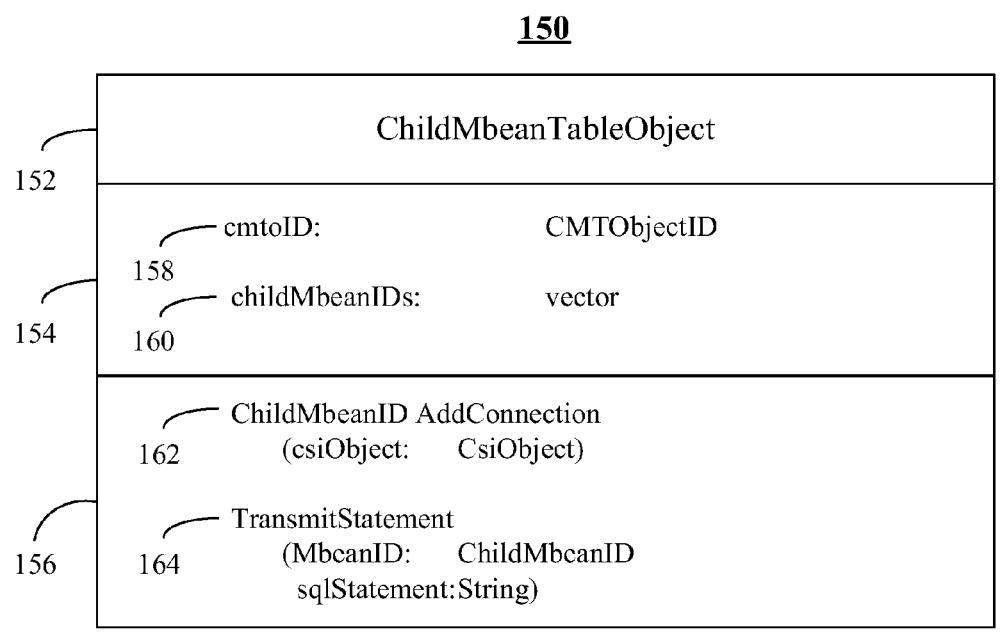
FIG. 3 is one example of a ChildMbeanTableObject (CMTO) memory object employed in one example of an implementation of the claimed subject matter.

FIG. 3 is one example of a ChildMbeanTableObject (CMTO) 150 memory object 150 employed in an implementation the claimed subject matter. CMTO 150 is an example of one possible embodiment of child_table_1 116, introduced above in conjunction with FIGS. 1 and 2. CMTO memory object 150 includes a title section 152, which merely states the name of object 200, i.e. "ChildMbeanTableObject," an attribute section 154, which contains memory elements, or attributes, associated with CMTO memory object 150, and a method section 156, which includes functions, or methods, that may be executed in conjunction with CMTO memory object 150. It should be noted that the attributes and methods described are used for the purpose of illustration only. Additional and/or different attributes and methods may be employed to implement the claimed subject matter.

Attribute section 154 includes a "cmtoID" attribute 158 and a "childMbeanIDs" attribute 160. In this example, instantiations of object 150 are stored as child_table_1 116 in conjunction with Mbean_1 114 (FIGS. 1 and 2). CmtoID attribute 158 is a variable of type CMTObjectID that contains a reference to the particular instance of object 150. Each instance of object 150 has a unique value for attribute 158 that allows each instance to be uniquely identified. ChildMbeanIDs attribute 160 is a variable of type Vector that stores references to instantiations of child Mbeans, created in accordance with the disclosed technology. Mbean_1A 118 and Mbean_B 120 are examples of examples of child Mbeans that are referenced by attribute 160. Both attribute 158 and 160 are described in more detail below in conjunction with FIGS. 4-8.

Method section 156 of object 150 includes two exemplary functions, or methods, i.e. an AddConnection method 162 and a TransmitStatement method 164. Only two methods are illustrated for the sake of simplicity. Those with skill in the programming arts should appreciate that an object such as object 150 would typically include many additional methods including, but not limited to, constructors, destructors, and methods to set and get values for various attributes. It should also be understood that CMTO memory object 150 is only one example of a memory object that may be used to implement the claimed subject matter. Other memory objects with fewer, more and/or different attributes and methods may be employed. In addition, there are many ways other than employing object 150 to implement the functionality and data storage of the claimed subject matter. For example, the claimed subject matter may be implemented by means of a computer program in conjunction with a relational database.

Figure 4:
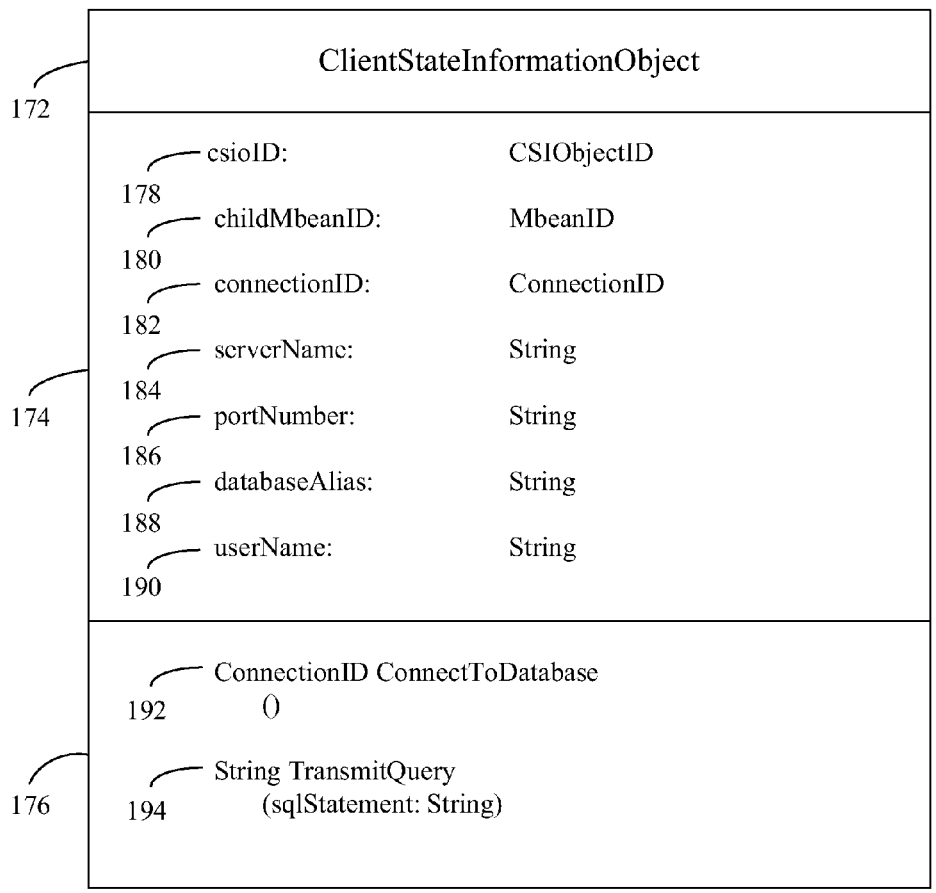
FIG. 4 is one example of a ClientStateInformationObject (CSIO) memory object employed in one example of an implementation of the claimed subject matter.
Figure 5:
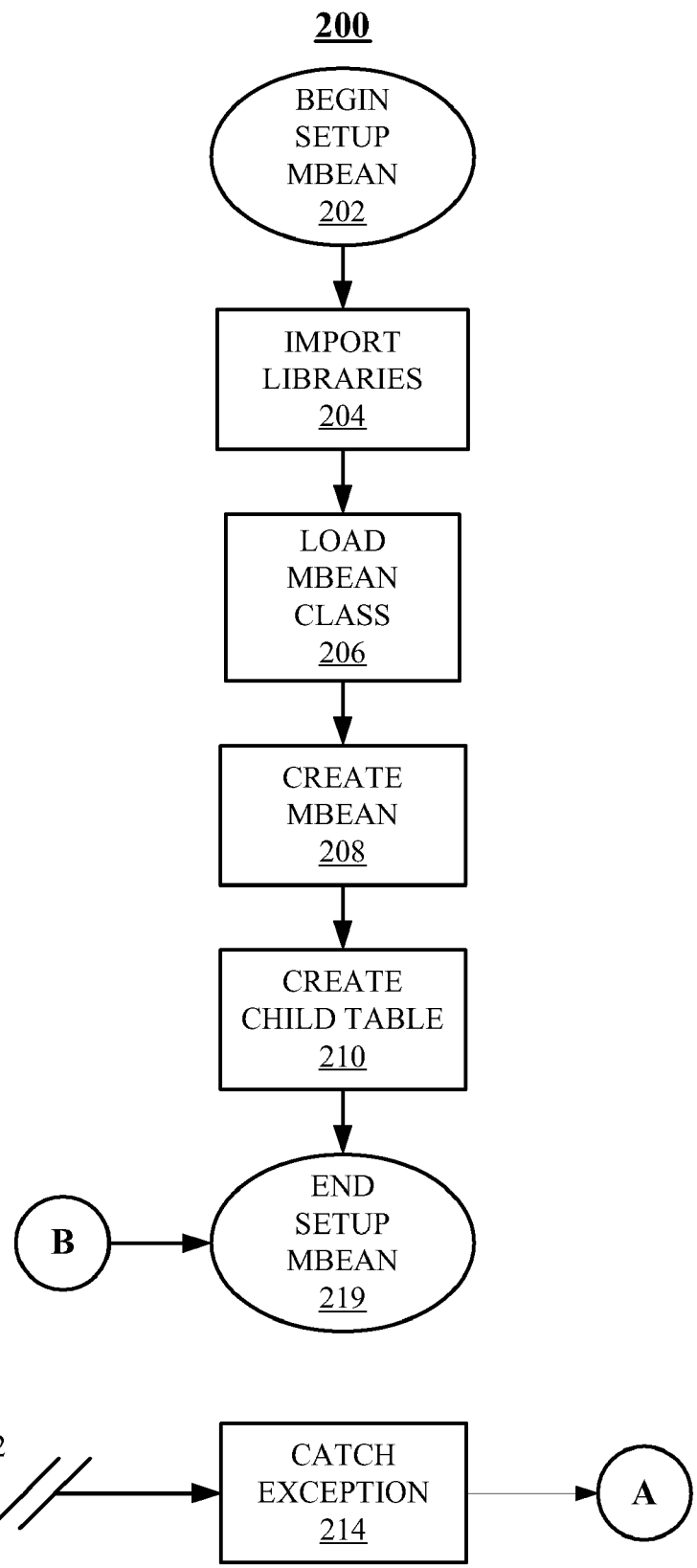
FIG. 5 is a flowchart of a Setup Mbean process that is one example of an implementation of the claimed subject matter.

AddConnection method 162 is called during a Create Mbean block 262 of a Setup Mbean process 200 (see FIG. 5). Method 162 is called with one parameter, a csiObject parameter, which is variable of type CSIObject. Variables of type CSIObject are described in more detail below in conjunction with FIG. 4. Simply stated, method 162 is called when the user desires to create a new connection to a particular database (not shown). Information in the csiObject parameter provides the information necessary for a parent Mbean such as Mbean_1 114 (FIGS. 1 and 2) to create a new child Mbean such as Mbean_1A 118 (FIGS. 1 and 2) or Mbean_1B 120 (FIGS. 1 and 2), establish a connection to the specified database and provide to the new child Mbean client state information corresponding to the calling process.

Figure 6:
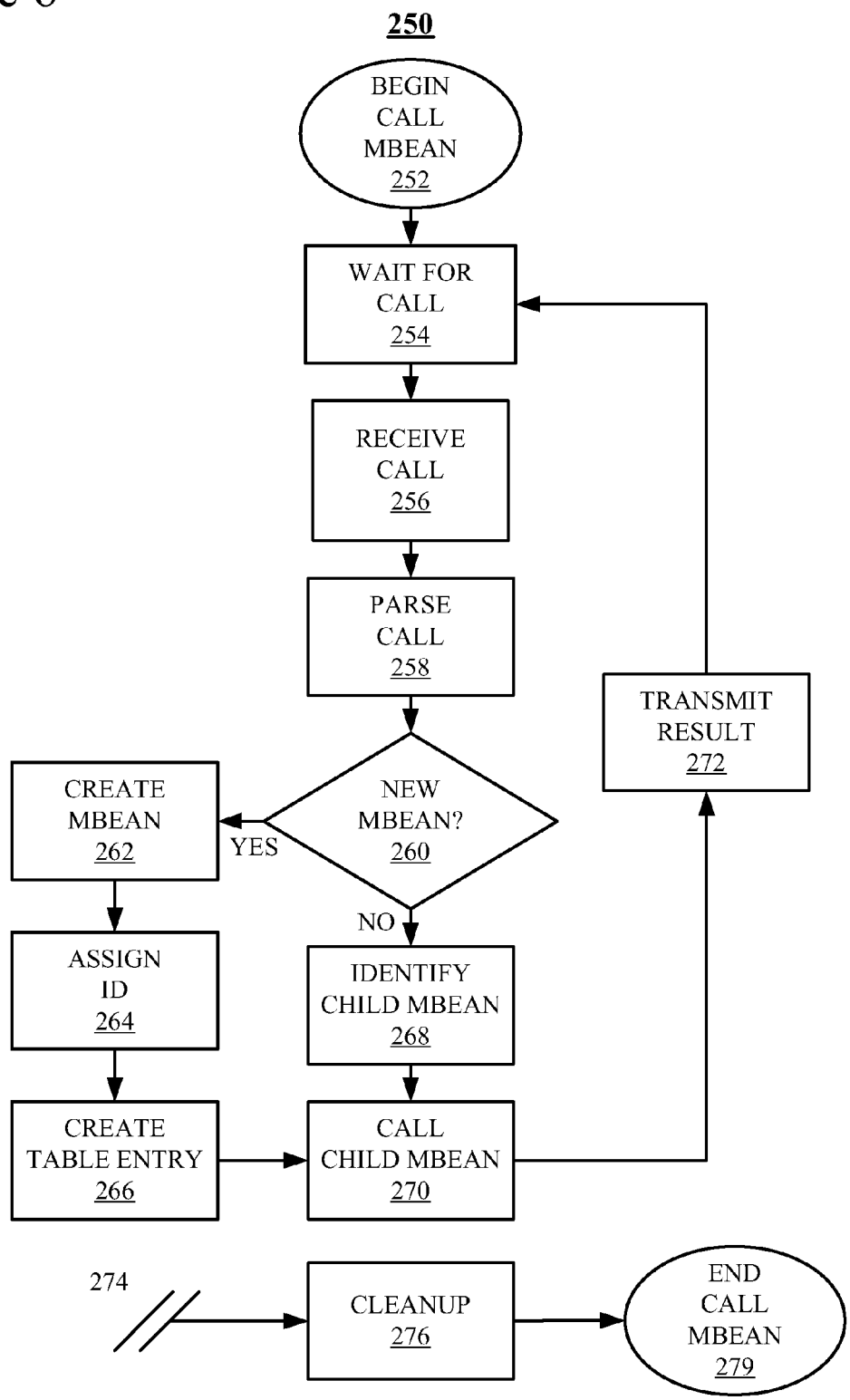
FIG. 6 is a flowchart of a Call Mbean process employed in the implementation introduced in conjunction with FIG. 5.

TransmitStatement method 164 is called during a Call Child Mbean block 270 of a Call Mbean process 250 (see FIG. 6). Method 164 is called with two (2) parameters, a MbeanID parameter of type ChildMbeanID and a sqlStatement parameter of type String. MbeanID parameter enables Mbean_1 114 to identify the appropriate child Mbean to which to transmit the request, which is embodied in the sqlStatement parameter. It should be noted what is not necessary to transmit is client state information or any information relating to the particular database to which the query is directed. Mbean_1 114 identifies the appropriate child Mbean with the MbeanID parameter and client state information was transmitted to the child when the child was created with AddConnection method 162. SqlStatement parameter stores an structured query language (SQL) statement that is transmitted to the database associated with a connectionID attribute 182 (see FIG. 4) in expectation of a reply.

It should be noted that database connectivity and query is only one example of possible ways to employ the disclosed technology. Those with skill in the computing arts should appreciate many other applications that should benefit from an application of the claimed subject matter.

FIG. 4 is one example of a ClientStateInformationObject (CSIO) memory object 170 employed in one implementation of the claimed subject matter. CSIO 170 is an example of one embodiment of CSIO_1A 119 and CSIO_1B 121, introduced above in conjunction with FIG. 1. CSIO 170 includes a title section 172, which merely states the name of object 200, i.e. "ChildStateInformationObject," an attribute section 174, which contains memory elements, or attributes, associated with CSIO 170, and a method section 176, which includes functions, or methods, that may be executed in conjunction with CSIO 170. It should be noted that the attributes and methods described are used for the purpose of illustration only. Additional and/or different attributes and methods may be employed to implement the claimed subject matter.

Attribute section 172 of CSIO 170 includes a csioID attribute 178, a childMbeanID attribute 180, a connectionID attribute 172, a serverName attribute 184, a portNumber attribute 186, a databaseAlias attribute 188 and a userName attribute 190. CsioID attribute 178 is a variable of type CSIObjectID that contains a reference to the particular instance of object 170. Each instance of object 170 has a unique value for attribute 178 that allows each instance to be uniquely identified.

ChildMbeanID attribute 180, which is a variable of type CSIObjectID, identifies a specific Mbean with which object 170 is associated. ConnectionID attribute 182, which is a variable of type MbeanID, identifies a particular connection with which the corresponding child Mbean is associated. ServerName attribute 184, portNumber attribute 186, databaseAlias attribute 188 and userName attribute 190, which are all variables of type String, store information relating to the associated connection, including the database name and specific information required to establish a connection.

Method section 176 of object 170 includes two exemplary functions, or methods, i.e. a ConnectToDatabase method 192 and a TransmitQuery method 194. ConnectToDatabase method 192 is a function called during Create Mbean block 262 of Call Mbean process 250 (see FIG. 6) that returns a value of type ConnectionID. Method 192 employs the information stored in attributes 184, 186, 188 and 190 to establish a connection to the referenced database. The value returned is stored in connectionID attribute 182. TransmitQuery method 194 is a function that returns a value of type String. The return value represents a reply from the database referenced in attribute 182 to a query stored in the parameter of method 194, i.e. sqlStatement, a variable of type String.

Only two methods are illustrated for the sake of simplicity. Those with skill in the programming arts should appreciate that an object such as object 170 would typically include many additional methods including, but not limited to, constructors, destructors, and methods to set and get values for various attributes. It should also be understood that CSIO 170 is only one example of a memory object that may be used to implement the claimed subject matter. Other memory objects with fewer, more and/or different attributes and methods may be employed. In addition, there are many ways other than employing object 170 to implement the functionality and data storage of the claimed subject matter. For example, the claimed subject matter may be implemented by means of a computer program in conjunction with a relational database.

FIG. 5 is a flowchart of a Setup Mbean process 200 that is one example of an implementation of the claimed subject matter. In this example, Process 200 is stored in data storage 112 (FIG. 1) and executed on a processor (not shown) of CPU 104 (FIG. 1), both of which are incorporated into client system 102 (FIG. 1). Of course, process 200, libraries and any other necessary code may be stored in places other then data storage 112. For example, process 200 may retrieve any necessary code from server 130 (FIG. 1) via the Internet 128 (FIG. 1).

Process 200 starts in a "Begin Setup Mbean" block 202 and proceeds immediately to an "Import Libraries" block 204. During block 204, process 200 retrieves from data storage 112 any necessary library modules (not shown) that may be necessary to implement the desired functionality. During a "Load Mbean Class" block 206, process 200 retrieves from data storage 112 appropriate class definitions to define an instantiation of a parent Mbean, which in this example is an instantiation of Mbean_1 114 (FIGS. 1 and 2). During a "Create Mbean" block 208, process 200 creates Mbean_1 114 by allocating memory for the class definition retrieved during block 206 and the libraries retrieved during block 204.

During a "Create Child Table" block, process 200 creates a child table, which in this example is child_table_1 116 (FIGS. 1 and 2). One example of the structure of a child table is a ChildTableObject 150, described above in conjunction with FIG. 3. Once child_table_1 is created, process 200 proceeds to an "End Setup Mbean" block 219 in which process 200 is complete.

If, during the processing associated with blocks 204, 206, 208 and 210, an error occurs, for example memory or a particular piece of necessary code is not available, an asynchronous interrupt 212 is generated. In that case, process 200 proceeds to a "Catch Exception" block 214. During block 214, process 200 halts any currently executing processing and proceeds to a transition point A. Once processing associated with the generation of an exception has executed, process 200 returns to End Setup Mbean block 219, in which process 200 is complete, via a transmission point B. Transition points A, B and the exception processing that occurs between points A and B are described in more detail below in conjunction with FIG. 8.

FIG. 6 is a flowchart of a Call Mbean process 250 employed in the implementation introduced in conjunction with FIG. 5. In this example, Process 250 is stored in data storage 112 (FIG. 1) and executed on a processor (not shown) of CPU 104 (FIG. 1), both of which are incorporated into client system 102 (FIG. 1). Process 250 represents processing executed by Mbean_1 114 (FIGS. 1 and 2) once Mbean_1 114 has been instantiated by Setup Mbean process 200, described above in conjunction with FIG. 4.

Process 250 starts is a "Begin Call Mbean" block 252 and proceeds immediately to a "Wait for Call" block 254. During block 254, process 250 is in a suspended state waiting until a request to access a child Mbean such as Mbean_1A 118 (FIGS. 1 and 2) or Mbean_1B 120 (FIGS. 1 and 2) is received. Once a request is received, process 250 proceeds to a "Receive Call" block 256 and then to a "Parse Call" block 258. During block 258, process 250 makes a determination, based upon information included with the specific call, how to process with execution.

During a "New Mbean?" block 260, process 250 determines whether of not the call received during block 256 and parsed during block 258 represents a request to access a child Mbean that does not yet exist. If so, process 250 proceeds to a "Create Mbean" block 262 during which the requested child Mbean is created. Once the new Mbean is created during block 262, process 250 creates, during an "Assign ID" block 264, a childMbeanID 180 (FIG. 4) to uniquely identify the Mbean. During a "Create Table Entry" block 266, process 250 adds information relating to the newly created Mbean into the ChildMbeanTableObject 150 created during block 210 (FIG. 5) of Setup Mbean process 200, which in this example is child_table_1 116 (FIGS. 1 and 2).

If, during block 260, process 250 determines that the call received during block 258 is associated with an already existing Mbean, control proceeds to an "Identify Child Mbean" block 268. During block 268, process 250 correlates the received call to a particular child Mbean based upon information stored in child_table_1 116.

Following block 268 and blocks 266 control proceeds to a "Call Child Mbean" block 270. During block 270, process 250 makes a call to the child Mbean, which was either identified during block 268 or instantiated during block 262. It should be noted that, if the call received during block 256 was merely a request for the creation of a child Mbean, process 270 passes through block 270 without making a call. Once the appropriate Mbean has been called (or not, if the call received during block 256 was a request to create a child Mbean), process 250 proceeds to a Transmit Result block 272 during which process 250 transmits to the process that initiated the call received during block 256 the results of the current processing. Results may include a query result as generated by a Run Qurey process 300, described below in conjunction with FIG. 7, a return of the childMbeanID generated during block 264 so that the calling process may specify the created Mbean in any future calls, or both. Process 250 then returns to Wait for Call block 254 and processing continues as described above.

Process 250 is designed to operate continuously as long as Mbean_1 114 is executing. In the event, Mbean_1 114 is terminated, either explicitly by a user or automatically as result of another related process, an asynchronous interrupt 274 is generated. From interrupt 274 process 250 proceeds to a "Cleanup" block 276 during which any necessary functions are executed to terminate Mbean_1 114. Two examples of cleanup processes are the termination of any related child Mbeans and the release of any memory that may have been allocated during the creation and execution process 250. Finally, process 250 proceeds to an "End Call Mbean" block 279 in which process 250 is complete.

Figure 7:
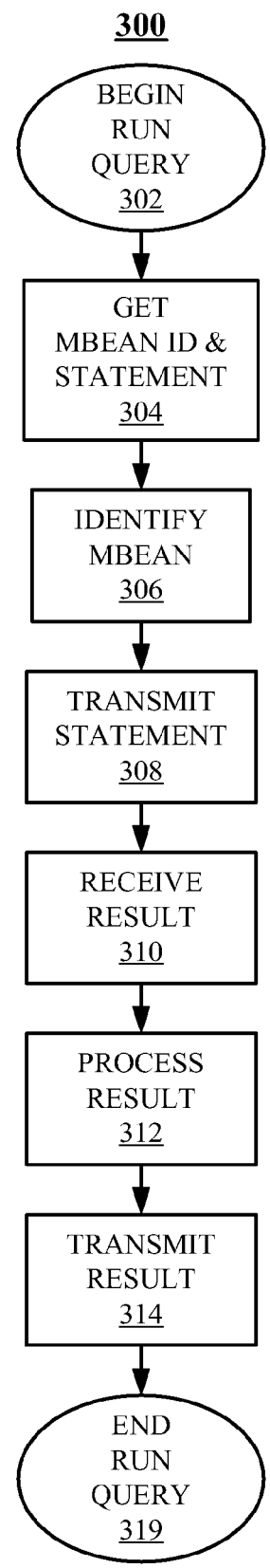
FIG. 7 is a flowchart of a Run Query process employed in conjunction with the process of FIG. 6.

FIG. 7 is a flowchart of a Run Query process 300 employed in conjunction with the process 250 of FIG. 6. In this example, Process 300 is stored in data storage 112 (FIG. 1) and executed on a processor (not shown) of CPU 104 (FIG. 1), both of which are incorporated into client system 102 (FIG. 1). Process 300 correlates to a particular call to a parent Mbean such as Mbean_1 114 (FIGS. 1 and 2).

Process 300 starts in a "Begin Run Query" block 302 and proceeds immediately to a "Get MbeanID & Statement" block 304. During block 304, Mbean_1 114, via process 300, receives a childMbeanID, such as one stored in childMbean attribute 180 (FIG. 4), in conjunction with a SQL statement that represents a request for data from a particular database. As explained above in conjunction with FIGS. 4 and 6, a childMbeanID uniquely identifies a particular child Mbean and thus, in this example, a connection to a particular database. During an "Identify Mbean" block 306, process 300 correlates the childMbeanID received during block 304 with a particular child Mbean, which in this example is Mbean_1A 118 (FIGS. 1 and 2).

During a "Transmit Statement" block 308, the SQL statement received during block 304 is transmitted to Mbean_1A 118, which was identified during block 306. During a "Receive Result" block 310, process 300 receives a reply form Mbean_1 118 in response to the query transmitted during block 308. During a "Process Result" block 312, process 300 evaluates the reply received during block 310, i.e. determines whether the reply is a bona fide reply or an error message and acts accordingly. During a "Transmit Result" block 314, process 300 transmits the replay received during block 310 or an error message generated during block 312 to the process that originated the statement received during block 304. Finally, process 300 proceeds to an "End Run Query" block 319 in which process 300 is complete.

It should be noted that the processing of the disclosed technology, enables a process to, in this example, to establish multiple database connections and have those connections be managed by Mbean_1 114. This greatly simplifies what would otherwise be the management of multiple Mbeans. Those with skill in the computing arts should appreciate that the disclosed technology has application in many areas other than database connectivity.

Figure 8:
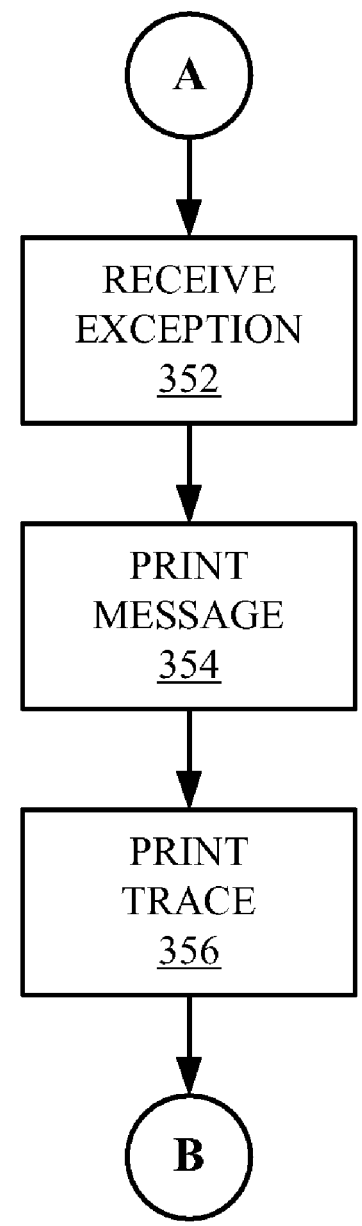
FIG. 8 is a flowchart of a Handle Exception process employed in conjunction with Setup Mbean process of FIG. 5.

FIG. 8 is a flowchart of a Handle Exception process 350 employed in conjunction with Setup Mbean process of FIG. 5. In this example, Process 350 is stored in data storage 112 (FIG. 1) and executed on a processor (not shown) of CPU 104 (FIG. 1), both of which are incorporated into client system 102 (FIG. 1). Although process 350 is described with respect to the exception handling functionality associated with Setup Mbean process 200 (FIG. 5) any processes associated with the disclosed technology, either described or not, would have a similar exception handling capability.

Process 350 is entered from process 200 via transition point A (FIG. 5) and proceeds immediately to a "Receive Exception" block 352. During block 252, process 350 receives the exception caught during Catch Exception block 214 (FIG. 5) of process 200. During a "Print Message" block 354, an appropriate error message is transmitted to the user or process that initiated process 200. In addition, a message may be displayed on monitor 106 (FIG. 1) of client system 102. During a "Print Trace" block 356, process 350 logs a execution trace file so that, if necessary, the user or process that initiated process 200 is able to determine the cause of the exception. Finally, process 350 enters transition point B (FIG. 5), which returns control to End Setup Mbean block 219 as described above in conjunction with FIG. 5.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

I claim:

1. A method, comprising:
   allocating memory, coupled to a processor, for a parent class object based upon a parent class object description;
   generating, by the parent class object, a first child class object based upon a child class object description;
   assigning the first child class object a first identifier unique from a second identifier corresponding to a second child class object, wherein the second child class object is also generated by the parent class object based upon the child class object description; and
   storing the first identifier so that the first child class object may be distinguished from the second child class object.

2. The method of claim 1, further comprising:
   passing, client state information to the first child class object; and
   storing the. client state information in conjunction with the first child class object.

3. The method of claim wherein the client state information is information corresponding to a connection between an associated client and a database.

4. The method of claim further comprising:
   calling the parent class object;
   passing an identifier to the parent class object in conjunction with the call to the parent class object;
   correlating the passed identifier with either the first identifier or the second identifier; and
   calling either the first child class object or the second child class object based upon whether the passed identifier correlates to the first identifier or the second identifier, respectively.

5. The method of claim 1, wherein the parent class object, the first child class object and the second child class object are JAVA® programming objects.

6. The method of claim 1, wherein the first child class object provides a connection to a first database and the second child class object provides a connection to a second database.

7. The method of claim 1, wherein the first child class object provides a connection to a first communication channel and the second class object provides a connection to a second communication channel.

8. A system, comprising:
a processor;
memory coupled to the processor;
a parent class object description;
a child class object description;
logic, stored on the memory and executed on the processor, for generating, by a parent class object generated according to the parent class object description, a child class object based upon the child class object description;
a first identifier corresponding to the first child class object; and
logic, stored on the memory and executed on the processor, for distinguishing, based upon the first identifier, the first child class object from a second child class object, wherein the second child class object is based upon the child class object description and generated by the parent class object.

9. The system of claim 8, further comprising:
client state information corresponding to a client that generates the parent class object; and
logic, stored on the memory and executed on the processor for:
passing the client state information to the first child class object; and
storing the client state information in conjunction with the first child class object.

10. The system of claim 9, wherein the client state information is information corresponding to a connection between the client and a database.

11. The system of claim 8, further comprising:
logic, stored on the memory and executed on the processor, for:
calling the parent class object;
passing an identifier to the parent class object in conjunction with the call to the parent class object;
correlating the passed identifier with either the first identifier or the second identifier; and
calling either the first child class object or the second child class object based upon whether the passed identifier correlates to the first identifier or the second identifier, respectively.

12. The system of claim 8, wherein the parent class object, the first child class object and the second child class object are JAVA® programming objects.

13. The system of claim 8, wherein the first child class object provides a connection to a first database and the second child class object provides a connection to a second database.

14. The system of claim 8, wherein the first child class object provides a connection to a first communication channel and the second class object provides a connection to a second communication channel.

15. A computer programming product, comprising:
a memory,
logic, stored on the memory for execution on a processor, for allocating memory for a parent class object based upon a parent class object description;
logic, stored on the memory for execution on the processor, for generating, by the parent class object, a first child class object based upon a child class object description;
logic, stored on the memory for execution on the processor, for assigning the first child class object a first identifier unique from a second identifier corresponding to a second child class object, wherein the second child class object is also generated by the parent class object based upon the child class object description and
logic, stored on the memory for execution on the processor, for storing the first identifier so that the first child class object may be distinguished from the second child class object.

16. The computer programming product of claim 15, further comprising:
logic, stored on the memory for execution on the processor, for passing client state information to the first child class object; and
logic, stored on the memory for execution on the processor, for storing the client state information in conjunction with the first child class object.

17. The computer programming product of claim 16, wherein the client state information is information corresponding to a connection between an associated client and a database.

18. The computer programming product of claim 15, further comprising:
logic, stored on the memory for execution on the processor, for calling the parent class object;
logic, stored on the memory for execution the processor, for passing an identifier to the parent class object in conjunction with the call to the parent class object;
logic, stored on the memory for execution on the processor, for correlating the passed identifier with either the first identifier or the second identifier; and
logic, stored on the memory for execution on the processor, for calling either the first child class object or the second child class object based upon whether the passed identifier correlates to the first identifier or the second identifier, respectively.

19. The computer programming product of claim 15, wherein the parent class object, the first child class object and the second child class object are JAVA® programming objects.

20. The computer programming product of claim 15, wherein the first child class object provides a connection to a first database and the second child class object provides a connection to a second database.

* * * * *